April 19, 1966  L. S. KRAFT, JR  3,247,038
METHOD OF VULCANIZING BELTS
Filed May 4, 1962

INVENTOR.
LOUIS SEELBACH KRAFT, JR
BY
J. B. Holden
ATTORNEY

United States Patent Office 3,247,038
Patented Apr. 19, 1966

3,247,038
METHOD OF VULCANIZING BELTS
Louis Seelbach Kraft, Jr., Cuyahoga Falls, Ohio, assignor to The Goodyear Tire & Rubber Company, Akron, Ohio, a corporation of Ohio
Filed May 4, 1962, Ser. No. 192,378
2 Claims. (Cl. 156—164)

This invention relates to a method of vulcanizing conveyor, power transmission, and other belts that are reinforced with textile plies that are composed of a synthetic linear polymer having shrinkage characteristics similar to nylon. The use in belts of fabric plies composed of synthetic linear filaments, such as nylon, is desirable because of the low cost per unit of strength, resistance to mildew, acids and bases, good flexibility, low moisture absorption, impact resistance and fatigue resistance of such material. However, a serious obstacle to the successful use of nylon textile materials in belts has been the tendency of the nylon reinforcing elements to stretch excessively upon the initial application of load and to grow excessively during use.

This invention provides a method of vulcanizing belts reinforced with cord or fabric made of nylon, or other heat-shrinkable synthetic linear polymer, which substantially reduces the initial stretch and excessive growth of such belts.

A further object of the invention is to provide a rapid, inexpensive method of vulcanizing belts reinforced with fabric having warp elements of nylon or other similar heat-shrinkable synthetic polymeric material.

Figure 1:
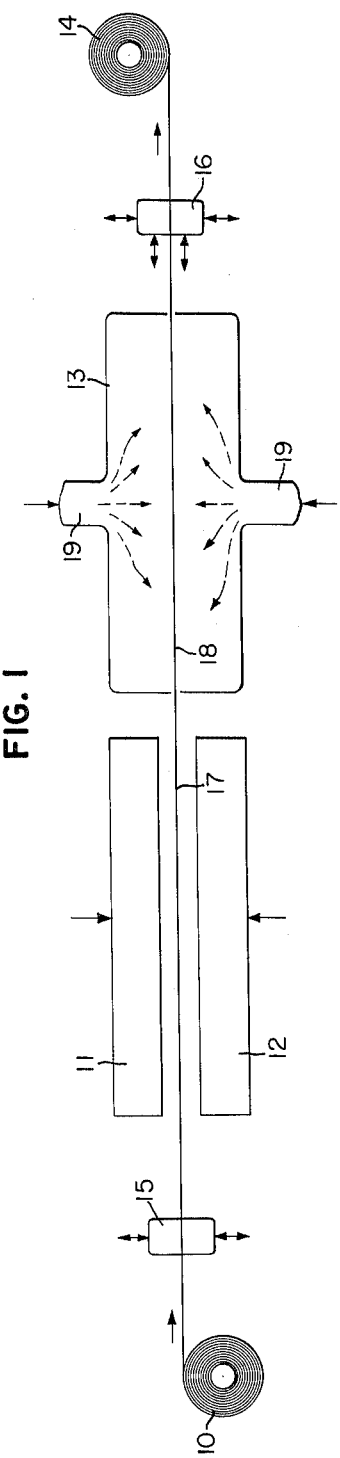
Figure 2:
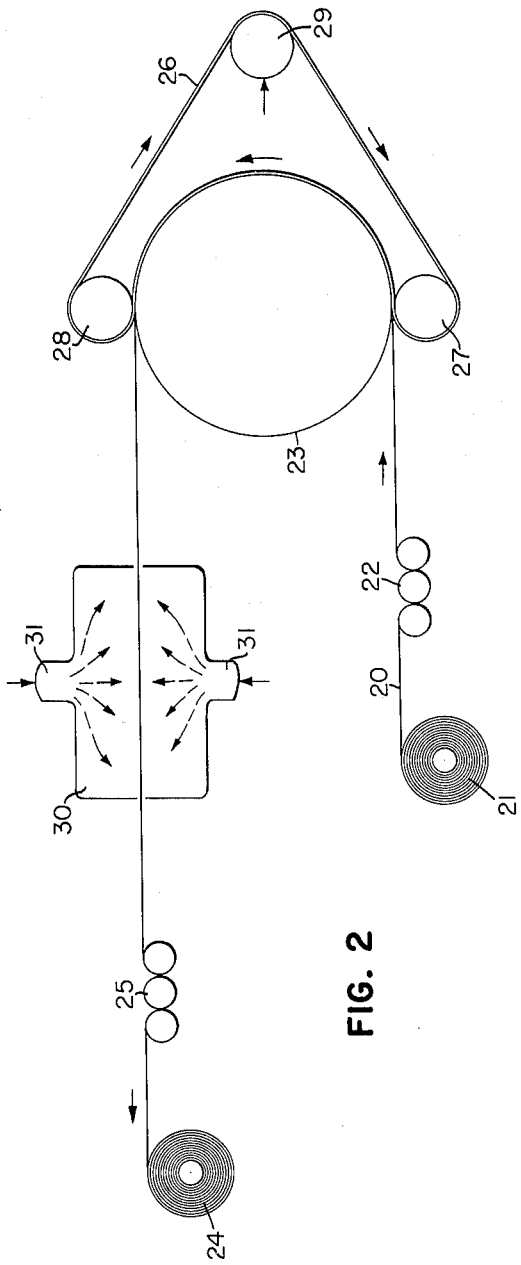

Other objects and advantages of the present invention will occur to those skilled in the art from the following description when read in conjunction with the drawings, in which FIG. 1 is a schematic view of an apparatus for practicing the method of this invention, and FIG. 2 is a schematic view of a modified apparatus for practicing the method of this invention.

In applicant's method of making belts of nylon or other heat-shrinkable synthetic polymeric material, an uncured belt carcass is first formed having one or more rubber-coated plies of nylon fabric or parallel nylon cords which form the warp of the plies and extend lengthwise of the carcass. The green unvulcanized carcass is then stretched in an amount between 2 and 18 percent of its original length and the carcass is vulcanized in the stretched condition under heat and pressure sufficient to cure the rubber coating on the plies and the rubber covering of the belt carcass. The hot cured belt is then cooled while the belt is in stretched condition to a temperature at which the nylon cords have no appreciable shrinkage.

Referring to FIG. 1 of the drawings, a roll of uncured belt carcass material 10 is first formed in the usual manner by skim-coating one or more plies of nylon or other heat-shrinkable textile fabric having warp elements of cord or threads extending parallel to each other and longitudinally of the belt so that the warp elements provide a reinforcement in the belt carcass to absorb tensile forces. The belt carcass 10 is passed between a pair of heated platens 11 and 12 and then through a cooling chamber 13 to a wind-up roll 14. It is essential in the practice of this invention that the belt 10 be tensioned during the vulcanizing operation as well as during the subsequent cooling operation. As illustrated in FIG. 1, a fixed clamp 15 is provided to engage the portion of the belt 10 immediately prior to its passage between the platens 11 and 12. Positioned at the exit end of the chamber 13 is an additional clamp 16 which is supported for movement in a direction to and fro relative to the clamp 15. It is thus seen that the portion of the belt 10 lying between the clamps 15 and 16 may be stretched by closing each of the clamps 15 and 16 and then moving the clamp 16 in a direction away from the clamp 15 preferably in an amount between 2 and 18 percent of the length of the belt existing between the two pairs of clamps 15 and 16.

With the belt in stretched condition, as above described, the length 17 of the belt 10 between the platens 11 and 12 is subjected to heat and pressure by closing the platens into contact with the surfaces of the belt. Sufficient heat and pressure is thereby applied to cure or vulcanize the length 17 of belt 10 equal to the length of the platens.

During vulcanization, a portion 18 of the belt cured by the previous cycle of the apparatus is positioned within the chamber 13 and a cooling gas is blown through the ducts 19 in order to cool the portion 18 of the belt within the chamber 13 below the heat shrinkage temperature of the linear polymer of the cord, preferably at least below a temperature of approximately 260° F. at which temperature the warp cords have no appreciable shrinkage. It is thus seen that during each cycle of the apparatus shown in FIG. 1, a portion 17 of the belt is cured while another portion 18 of the belt is cooled below the heat shrinkage temperature of nylon and during both of these operations the respective lengths of the belts are tensioned. Thereafter, the platens are retracted as well as the clamps 15 and 16, and the cured belt is rolled upon the roll 14 so that a new length of the green or unvulcanized carcass belt is brought into register with the platens 11 and 12.

In the modified form of the invention, shown in FIG. 2, the belt is continuously processed rather than intermittently processed, as shown in FIG. 1. The green belt carcass 20 is unwound from the roll 21 and passed through a plurality of hold-back rolls 22 and thence around a heated drum 23. The drum 23 is supported for rotation in a fixed position and the belt 20 immediately prior to being wound upon the wind-up roll 24 is passed through a series of pull rolls 25. The portion of the belt between the hold-back rolls 22 and pull rolls 25 is under a stretching tension, preferably sufficient to stretch the belt from 2 to 18 percent. As the belt 20 passes around the heated drum 23, an endless pressure belt 26 presses the belt 20 against the surface of the heated drum 23. The belt 26 is supported upon two rolls 27 and 28 which are positioned for rotation adjacent the surface of the drum 23 and a tensioning roll 29. It is thus seen that the belt 20 enters the nip existing between the drum 23 and the roll 27 and exits from the nip between the drum 23 and roll 28, and during its passage around the drum 23 the belt 20 is subjected to a curing temperature and is under pressure between the surface of the drum 23 and the endless belt 26. After the belt 20 has been subjected to a curing temperature and pressure for a period of time sufficient to vulcanize the belt, it is cooled below the heat shrinkage temperature of the synthetic linear polymer from which the reinforcing cords or fabric are made prior to passage around the pull rolls 25. Such cooling of the belt may be accelerated by passing the belt 20 through a cooling chamber 30 into which a cooling gas, such as air, is pumped through the ducts 31.

Nylon-reinforced conveyor belts made according to the method of this invention exhibit a vast reduction in initial stretch or elongation of approximately 50 percent at the operating loads, and a substantial reduction in belt growth. Under actual dynamic test conditions, belts made according to this invention grew in overall length 2.5 percent in 900 hours of testing, whereas identical dynamic testing of belts made by conventional methods resulted in a 2.5 percent growth in less than 200 hours of identical testing.

While certain representative embodiments and details have been shown for the purpose of illustrating the invention, it will be apparent to those skilled in this art that various changes and modifications may be made therein without departing from the spirit or scope of the invention.

What is claimed is:

1. A method of manufacturing a belt made of rubber and heat-shrinkable nylon cord which comprises, forming a rubber belt carcass reinforced with at least one ply of parallel nylon cords which extend longitudinally of the belt, curing said belt under heat and pressure while the belt is stretched between 2 and 18 percent of its original length and thereafter cooling the belt to a temperature at which said cords have no appreciable shrinkage, said belt being stretched during said cooling operation to at least the same extent as during the vulcanizing operation.

2. A method of manufacturing a belt made of rubber and heat-shrinkable nylon cords which comprises, forming a rubber belt carcass reinforced with at least one ply of parallel nylon heat-shrinkable cords extending longitudinally of the belt, passing the belt between heated pressure applying surfaces to vulcanize the belt while the belt is under tension sufficient to stretch the cords of the belt between 2 and 18 percent of their original length, removing the belt from between said heated surfaces while maintaining said stretching tension, and thereafter cooling the belt to a temperature at which said nylon cords have no appreciable shrinkage while maintaining said stretching tension on the belt.

References Cited by the Examiner

UNITED STATES PATENTS

| | | | |
|---|---|---|---|
| 1,288,601 | 12/1918 | Jacobs | 156—163 |
| 1,370,597 | 3/1921 | Lambert | 156—161 |
| 2,034,466 | 3/1936 | Freedlander | 156—163 |
| 2,037,195 | 4/1936 | DeRabot | 156—163 |
| 2,509,741 | 5/1950 | Miles | 156—229 |
| 2,520,699 | 8/1950 | Sowerby et al. | 156—163 |
| 2,594,229 | 2/1952 | Snyder et al. | 156—163 |
| 3,042,568 | 7/1962 | Ludowici | 156—229 |

EARL M. BERGERT, *Primary Examiner.*

DOUGLAS J. DRUMMOND, *Examiner.*